(12) United States Patent
Sherstinsky et al.

(10) Patent No.: US 7,673,004 B1
(45) Date of Patent: *Mar. 2, 2010

(54) METHOD AND APPARATUS FOR SECURE IM COMMUNICATIONS USING AN IM MODULE

(75) Inventors: Alex Sherstinsky, Palo Alto, CA (US); Joseph Petviashvili, Foster City, CA (US); Eugene Mandel, Oakland, CA (US); Jonathan Christensen, San Ramon, CA (US)

(73) Assignee: Face Time Communications, Inc., Belmont, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 11/031,419

(22) Filed: Jan. 7, 2005

Related U.S. Application Data

(60) Provisional application No. 60/606,190, filed on Aug. 31, 2004.

(51) Int. Cl.
*G06F 15/16* (2006.01)

(52) U.S. Cl. .................. 709/206; 713/150; 713/153; 713/156; 709/207

(58) Field of Classification Search .............. 726/11, 726/14; 709/206, 229, 232, 246, 314, 207; 713/150, 151, 153, 154, 160, 161, 164, 168, 713/175, 200, 201, 156; 380/259; 705/50, 705/55, 51

See application file for complete search history.

(56) References Cited

U.S. PATENT DOCUMENTS

| | | |
|---|---|---|
| 5,943,478 A | 8/1999 | Aggarwal et al. |
| 5,999,932 A | 12/1999 | Paul |
| 6,052,372 A | 4/2000 | Gittins et al. |
| 6,212,548 B1 | 4/2001 | DeSimone et al. |
| 6,248,946 B1 | 6/2001 | Dwek |
| 6,260,148 B1 | 7/2001 | Aggarwal et al. |
| 6,292,800 B1 | 9/2001 | Eldreth |
| 6,301,609 B1 | 10/2001 | Aravamudan et al. |
| 6,308,238 B1 | 10/2001 | Smith et al. |
| 6,336,133 B1 | 1/2002 | Morris et al. |
| 6,339,784 B1 | 1/2002 | Morris et al. |
| 6,366,962 B1 | 4/2002 | Teibel |
| 6,389,132 B1 | 5/2002 | Price |
| 6,400,381 B1 | 6/2002 | Barrett et al. |
| 6,408,066 B1 | 6/2002 | Andruska et al. |
| 6,430,602 B1 | 8/2002 | Kay et al. |
| 6,449,344 B1 | 9/2002 | Goldfinger et al. |

(Continued)

OTHER PUBLICATIONS

Ramsdell et. al., "S/MIME Gateway Protocol", http://tools.ietf.org/html/draft-enc-smime-gateway-00, Jul. 12, 2001.*

*Primary Examiner*—Kieu Oanh Bui
*Assistant Examiner*—Hee Song
(74) *Attorney, Agent, or Firm*—Townsend and Townsend and Crew LLP

(57) ABSTRACT

Techniques for enabling secure communications between IM modules are provided. An IM is received from a first IM client for a second IM client at a first IM module. It is determined if the second IM client can receive IMs through a second IM module that is capable of receiving secure communications from the first IM module. If the second IM module is capable of receiving secure communications from the first IM module, an encrypted IM is sent from the first IM module to the second IM client. The encrypted IM is received at the second IM module, which decrypts the IM and sends the decrypted IM to the second IM client.

33 Claims, 5 Drawing Sheets

U.S. PATENT DOCUMENTS

| | | |
|---|---|---|
| 7,127,741 B2 * | 10/2006 | Bandini et al. .................. 726/14 |
| 7,131,003 B2 * | 10/2006 | Lord et al. .................. 713/168 |
| 2003/0125927 A1 | 7/2003 | Seme |
| 2003/0131061 A1 * | 7/2003 | Newton et al. .............. 709/206 |
| 2003/0204720 A1 * | 10/2003 | Schoen et al. .............. 713/153 |
| 2003/0204741 A1 * | 10/2003 | Schoen et al. .............. 713/200 |
| 2004/0015610 A1 * | 1/2004 | Treadwell .................. 709/246 |
| 2004/0088423 A1 * | 5/2004 | Miller et al. ................ 709/229 |
| 2004/0103318 A1 | 5/2004 | Miller et al. |
| 2004/0109518 A1 * | 6/2004 | Miller et al. ................ 375/356 |
| 2004/0111623 A1 | 6/2004 | Miller et al. |
| 2004/0133520 A1 * | 7/2004 | Callas et al. .................. 705/51 |
| 2004/0133775 A1 * | 7/2004 | Callas et al. ................ 713/153 |
| 2004/0136386 A1 | 7/2004 | Miller et al. |
| 2004/0210772 A1 * | 10/2004 | Hooker et al. ............... 713/201 |
| 2005/0114652 A1 * | 5/2005 | Swedor et al. .............. 713/156 |

\* cited by examiner

METHOD AND APPARATUS FOR SECURE IM COMMUNICATIONS USING AN IM MODULE

CROSS-REFERENCES TO RELATED APPLICATIONS

This application claims priority from U.S. Provisional Patent Application No. 60/606,190 filed Aug. 31, 2004 entitled METHOD AND APPARATUS FOR SECURE IM COMMUNICATIONS USING AN IM MODULE which is hereby incorporated by reference, as if set forth in full in this document, for all purposes.

The present application incorporates by reference for all purposes the entire contents of the following U.S. patent application Ser. No. 10/212,129, entitled MANAGEMENT CAPABILITIES FOR REAL-TIME MESSAGING NETWORKS, filed on Jul. 31, 2002.

BACKGROUND OF THE INVENTION

The present invention generally relates to instant messaging (IM) and more specifically to systems and methods for providing secure IM communications over IM networks.

With the advent on the Internet, users have been provided with a fast electronic means of communicating with each other. For example, instant messaging (IM) allows users to interact in real-time by trading text messages or any other messages (e.g., file transfers, images, etc.) through the Internet. IM is commonly performed over public instant messaging (PIM) networks. For example, a Yahoo! IM client can send text messages to other Yahoo! IM clients through a public instant messaging network maintained by Yahoo!. These IM communications are typically not encrypted (and hence not secure).

When IM communications are not secure, the text messages (also known as "IMs", for short) can be intercepted by unintended parties. For example, IMs may be sniffed by third parties as the messages traverse a PIM network. Accordingly, entities, such as businesses, may not wish to adopt IM applications for the fear that privacy/confidentiality may be compromised during IM communications among their employees and between the employees and customers, partners, family, friends, and others. Thus, these businesses are unable to take advantage of the convenience and efficiency that instant messaging provides.

One method that has been developed for sending encrypted IMs is encrypting an IM at an IM client. This solution includes many disadvantages. For example, it is very time consuming and error prone to configure every IM client in a business organization with the special module that encrypts IMs sent from the IM client and decrypts IMs received by the IM client. Additionally, it is very expensive to procure and maintain a certificate used for encrypting IM messages for each IM client installation.

BRIEF SUMMARY OF THE INVENTION

The present invention generally relates to techniques for securing IM communications. In one embodiment, systems and methods are provided for enabling secure communications between IM modules. In one embodiment, an IM is received from a first IM client for a username associated with a second IM client at a first IM module. It is determined if the second IM client can receive IMs through a second IM module that is capable of receiving secure (e.g., authenticated and encrypted) communications from the first IM module. If the second IM module is capable of receiving secure communications from the first IM module, an encrypted IM is sent from the first IM module to the username associated with the second IM client. The encrypted IM is received at the second IM module, which decrypts the IM and sends the decrypted IM to the username at the second IM client.

In one embodiment, a method for enabling secure IM communication is provided. The method comprises: receiving an IM from a first IM client for a username at a first IM module; determining if a second IM client associated with the username receives IMs through a second IM module that is capable of receiving secure IM communications from the first IM module; if the second IM module is capable of receiving secure IM communications from the first IM module, encrypting at least a portion of the IM at the first IM module; and sending the encrypted at least a portion of the IM to the username, wherein the second IM module receives the encrypted at least a portion of the IM, decrypts at least a portion of the IM, and sends the decrypted at least a portion of the IM to the username associated with the second IM client.

In another embodiment, a system for enabling secure IM communications is provided. The system comprises: a plurality of IM clients; a first IM module coupled to a first set of IM clients in the plurality of IM clients, wherein the first IM module receives IMs sent from and destined for an IM client in the first set of IM clients; a second IM module coupled to a second set of IM clients in the plurality of IM clients, wherein the second IM module receives IMs sent from and destined for a second IM client in the second set of IM clients; wherein the first IM module is configured to receive an IM from the first IM client, encrypt at least a portion of the IM, and send the encrypted at least a portion of the IM to a username associated with the second IM client, wherein the second IM module is configured to receive the encrypted at least a portion of the IM, decrypt at least a portion of the encrypted IM, and send the decrypted at least a portion of the IM to the username associated with the second IM client.

In yet another embodiment, an IM module configured to send and receive secure IM communications is provided. The IM module comprises: a receiver configured to receive an IM from a first IM client for a username at a first IM module; a secure communication analyzer configured to determine if a second IM client associated with the username receives IMs through a second IM module that is capable of receiving secure IM communications from the IM module; an encrypting processor configured to encrypt at least a portion of the IM at the first IM module if the second IM module is capable of receiving secure IM communications from the IM module; and a communicator configured to send the at least a portion of the IM to the username, wherein the second IM module receives the encrypted at least a portion of the encrypted IM, decrypts the at least a portion of the IM, and sends the decrypted at least a portion of the IM to the username associated with the second IM client.

A further understanding of the nature and the advantages of the inventions disclosed herein may be realized by reference of the remaining portions of the specification and the attached drawings.

DETAILED DESCRIPTION OF THE INVENTION

Figure 1:
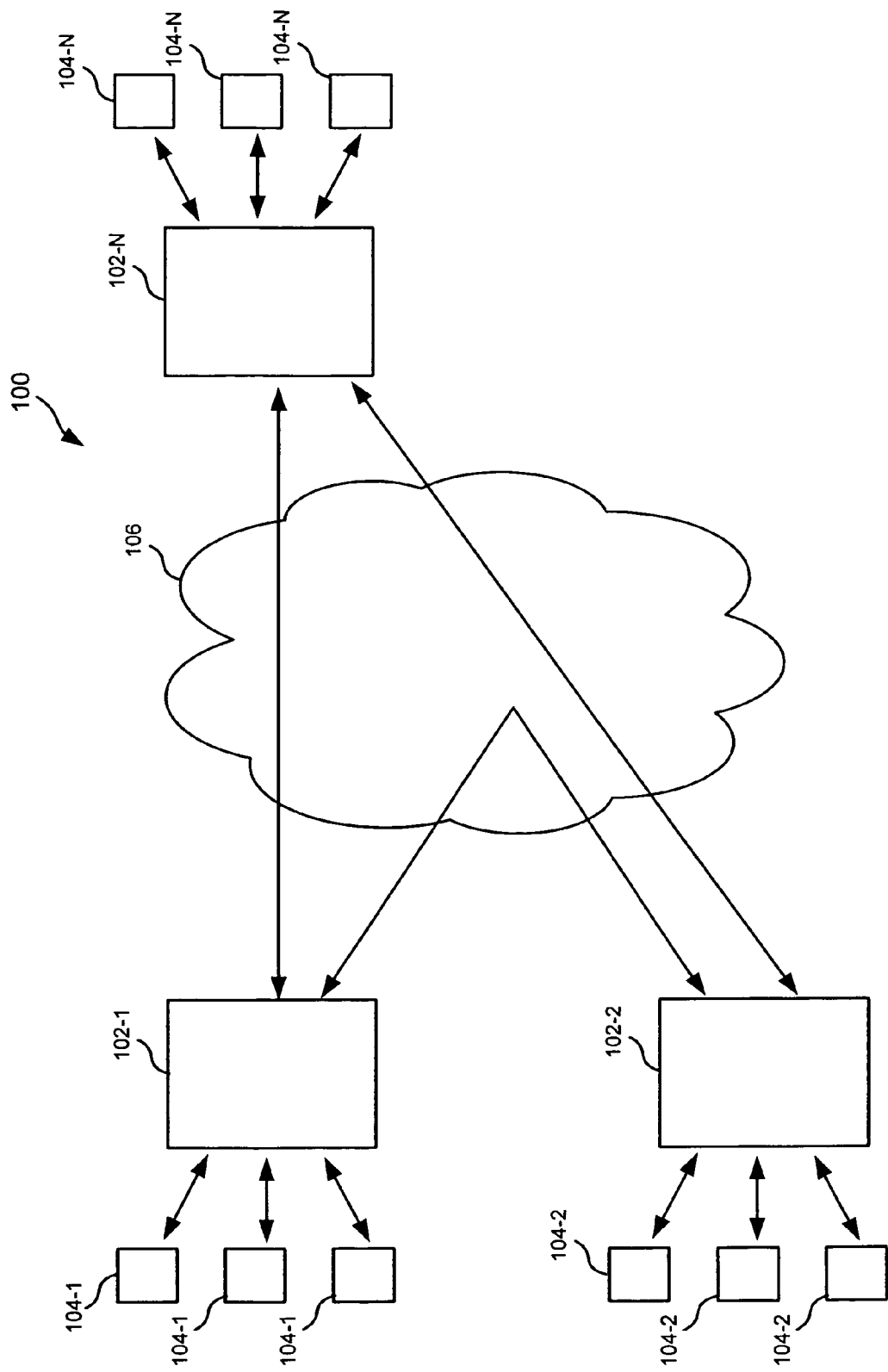
FIG. 1 depicts a system for providing secure IM communications according to one embodiment of the present invention

FIG. 1 depicts a system 100 for providing secure IM communications according to one embodiment of the present invention. System 100 includes a plurality of IM modules 102 and a plurality of IM clients 104. IM clients 104 communicate through IM modules 102, which communicate through a network 106.

IM clients 104 are used to send and receive instant message communications with other IM clients 104. IM clients 104 may be installed on any computing device, such as a personal computer (PC), pocket PC, personal digital assistant (PDA), RIM Blackberry device, telephone, cellular phone, pager, etc.

In one embodiment, IM clients 104 may send IMs that include textual messages. Additionally, IMs may include other information, such as pictures, HyperText Markup Language (HTML) information, etc. In one embodiment, IM clients 104 are IM clients of any network implementation. For example, the network implementations may include MSN, AIM, Yahoo!, ICQ, SMS, IBM Lotus IM (also known as "SameTime"), Microsoft Exchange 2000, Microsoft Office Live Communications Server (LCS), Reuters Messaging, Jabber, and the like. In one embodiment, IM clients 104 of a particular network implementation can communicate with IM clients 104 of the same network implementation.

Network 106 is any network that can support instant messaging. In one embodiment, network 106 includes one or more public IM networks. For example, if an IM client 104 is a Yahoo! IM client, IM from Yahoo! IMs clients are sent through a Yahoo! public IM network. The same is true for AOL IM (AIM for short) clients that communicate. For example, AOL maintains a public IM network (AIM) where IMs from AOL IM (AIM) clients are transmitted.

In one embodiment, network 106 is a network that is located outside of a firewall for a company. For example, network 106 may be a public IM network (AIM, MSN, Yahoo!), running on top of the Internet, or in some cases, a proprietary IM network, running over an extranet (e.g., a VPN built on top of the Internet). These networks are public in nature in that information sent through the network may be compromised.

IM clients 104 communicate by sending messages to usernames. For example, a username may be "Bob". A user sends an IM to a user associated with the username "Bob" by addressing the IM to the username "Bob". Typically, in order to communicate through instant messaging, a user has to be logged in to the IM network with an IM client 104. By logging in, an IM client 104 that is being used for the username "Bob" may be determined and IMs can be routed to the IM client 104. IMs are then sent to the username "Bob" and received at the IM client 104 being used.

IM module 102 is configured to receive and forward instant messages from IM clients 104. In one embodiment, IM module 102 is configured to receive and send instant messages to and from certain IM clients 104 that are connected to it. For example, IM module 102-1 is connected to IM clients 104-1. In one embodiment, all communications to and from IM clients 104-1 are sent through IM module 102-1.

IM module 102 is configured to forward IMs to a username where the IM is received at another IM client 104. These forwarded IMs are received at another IM module 102 and then forwarded to the IM client 104. For example, an IM sent from IM client 104-1 to a username associated with IM client 104-2 is first received at IM module 102-1. IM module 102-1 is then configured to send the IM to IM client 104-2. The IM, however, is received at IM module 102-2, which then forwards the IM to IM client 104-2. As will be described in more detail below, the IM sent from IM module 102-1 to IM module 102-2 is sent as an encrypted (secure) communication. For example, IM module 102-1 and IM module 102-2 negotiate the encryption parameters so that encrypted messages between IM module 102-1 and IM module 102-2 may be exchanged.

Embodiments of IM modules are also described in U.S. patent application Ser. No. 10/212,129, entitled "Management Capabilities for Real-Time Messaging Networks, filed on Jul. 31, 2002, which is hereby incorporated by reference for all purposes.

Figure 2:
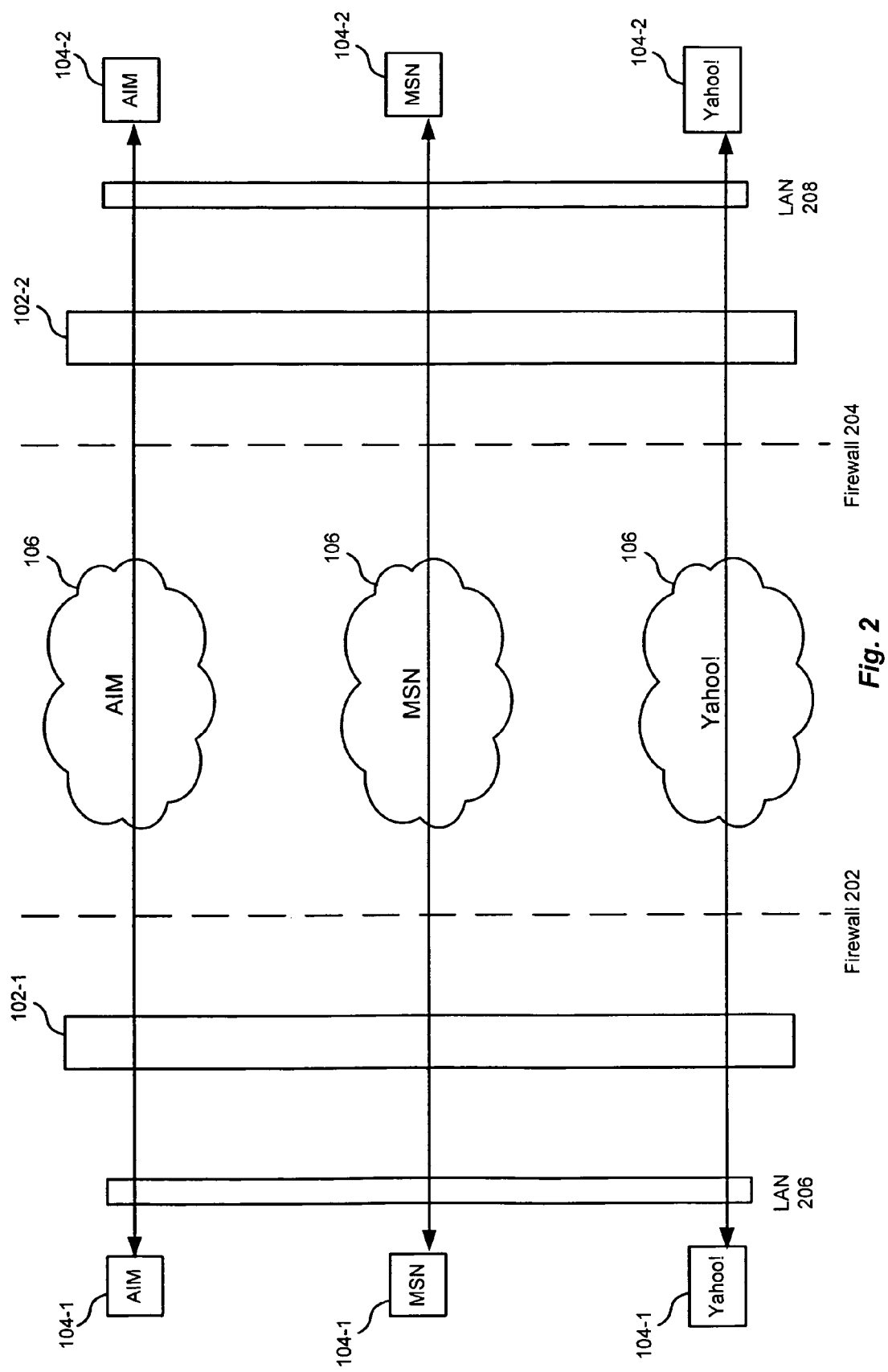
FIG. 2 depicts embodiment of system according to embodiments of the present invention.

FIG. 2 depicts an embodiment of system 100 according to embodiments of the present invention. As shown, IMs are sent through different public IM networks, such as AIM, MSN, and Yahoo! Public IM networks. Also, a firewall 202 and firewall 204 are shown. Firewall 202 may be a corporate firewall that is used to monitor communications to computers connected to a network behind the firewall. Thus, communications from public IM networks 106 are sent to and from IM module 102 through the firewall. For example, IM clients 104-1 communicate through IM module 102-1. IM module 102-1 sends and receives IMs through firewall 202 to and from public IM networks 106. The same is true for IM clients 104-2 and IM module 102-2.

IM clients 104-1 and IM module 102-1 may communicate over a local area network (LAN) 206 behind firewall 202. Although LAN 206 is described, other networks will be recognized by a person skilled in the art. Similarly, IM clients 104-2 and IM module 102-2 communicate over a LAN 208 behind firewall 204.

As shown, AIM IM clients 104 communicate with other AIM IM clients 104 through an AIM PIM network. Similarly, MSN IM clients 104 and Yahoo! IM clients 104 communicate through MSN and Yahoo! PIM networks, respectively.

Because IM module 102-1 is positioned behind firewall 202, IM module 102-1 is configured to manage communications from public IM clients 104-1 to entities outside firewall 202. Thus, IM module 102-1 can ensure that all IM communications sent from behind firewall 202 may be encrypted before being sent to other IM clients 104 outside of firewall 202. Accordingly, communications between IM module 102-1 to IM module 102-2 through public IM networks 106 may be secure. Although communications between public IM clients 104-1 and IM module 102-1 are not encrypted on the LAN behind firewall 202, it is assumed that the communications may not be intercepted for malicious purposes. Also, communications between public IM clients 104-1 on the LAN behind firewall 202 may not be encrypted, because it is assumed that these communications may not be intercepted altogether.

Figure 3:
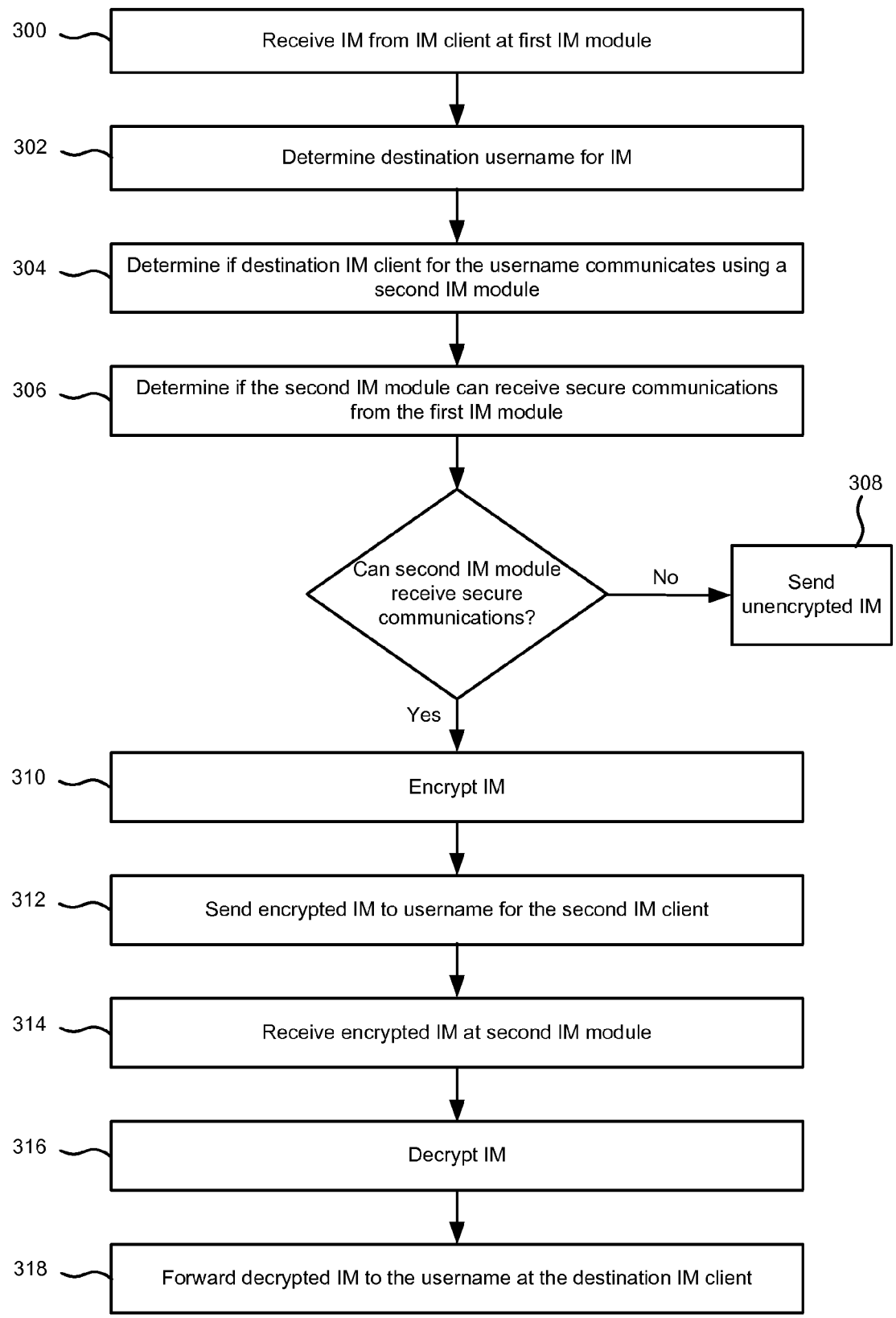
FIG. 3 depicts a simplified flow chart of method for enabling secure IM communications for IM clients according to one embodiment on the present invention.

FIG. 3 depicts a simplified flow chart of method for enabling secure IM communications for IM clients 104 according to one embodiment on the present invention. In step 300, an IM from an IM client 104-1 is received at a first IM module 102-1. In one embodiment, the IM received from IM client 104-1 is an IM sent from an IM client 104 that is addressed to a username for another user. For example, the IM may be addressed to a username "Bob". In one embodiment, the username is associated with another IM client 104-2 that may receive the IM. The username may be associated with IM client 104-2 because a user has logged onto IM client 104-2 using the username. Although IM clients 104-1 and 104-2 are described, it will be recognized that any IM clients 104 may be used.

In step 302, IM module 102-1 determines a destination for the IM. For example, if the IM is sent for username "Bob", IM module 102-1 determines the username from the IM.

In step 304, IM module 102-1 determines if the username for the IM may receive the IM at a destination IM client 104 that communicates using a second IM module 102. For example, a user for the username may be using an IM client 104-2 behind an IM module 102-2. In one embodiment, as will be described in more detail below, a query may be sent by IM module 102-1 to the username. If the IM is destined for a username that may be using IM client 104-2, IM module 102-2 receives the IM. IM module 102-2 can then reply to the query with information that may be used to determine if it can receive secure communications from IM module 102-1.

In step 306, it is determined if IM module 102-2 can exchange secure communications with IM module 102-1. For example, the message sent from IM module 102-2 is parsed and it may be determined that IM module 102-2 is enabled to receive secure communications. IM module 102-1 may also verify other information, such as a company name, etc. in determining if secure communications can be sent. For example, it is determined if a company name is on a list of companies that have IM modules 102 that can communicate securely. If the company name is on this list, then it is assumed that secure communications can be sent to IM module 102-2.

In step 308, if IM module 102-2 cannot receive secure communications or the username "Bob" is not situated behind an IM module 102, an unencrypted IM is sent to the username "Bob." Additionally, other actions may be taken, such as sending an IM to the username "Bob" telling the user that this message is not secure, but if an IM module is purchased, secure communications may be enabled.

In step 310, if secure communications may be sent to the username "Bob", at least a portion of the IM that was received in step 300 is encrypted. In one embodiment, information that was sent in the body of the IM received in step 300 (e.g., the text) is encrypted and sent in the body of an IM through the public IM network 106. In this case, a new IM is generated that is encrypted. In other embodiments, the IM received in step 300 may be encrypted and sent.

In step 312, the encrypted IM is sent to the username for IM client 104-2. In one embodiment, the IM is generated to show that it is from "Alice" to "Bob". The IM is then sent through the public IM network 106.

In step 314, the encrypted IM is sent through PIM network 106 and received at IM module 102-2. The encrypted IM is received at IM module 102-2 because it is configured to receive messages from network 106 that are destined for the username using IM client 104-2.

In step 316, IM module 102-2 decrypts the encrypted IM. The decryption process will be described in more detail below.

In step 318, the decrypted IM is forwarded to the username at IM client 104-2. Thus, the user using IM client 104-2 who is logged in with the username "Bob" receives an IM that was sent from a username, such as "Alice". For example, the original text that was received in the IM received in step 300 is sent to destination IM client 104-2.

All subsequent messages as part of this IM conversation between the usernames "Alice" and "Bob" may be communicated between IM modules 102-1 and IM modules 102-2 as encrypted versions inside the "body" portions of IM messages. In other words, the contents of message bodies are encrypted when IMs traverse the public IM networks.

Figure 4:
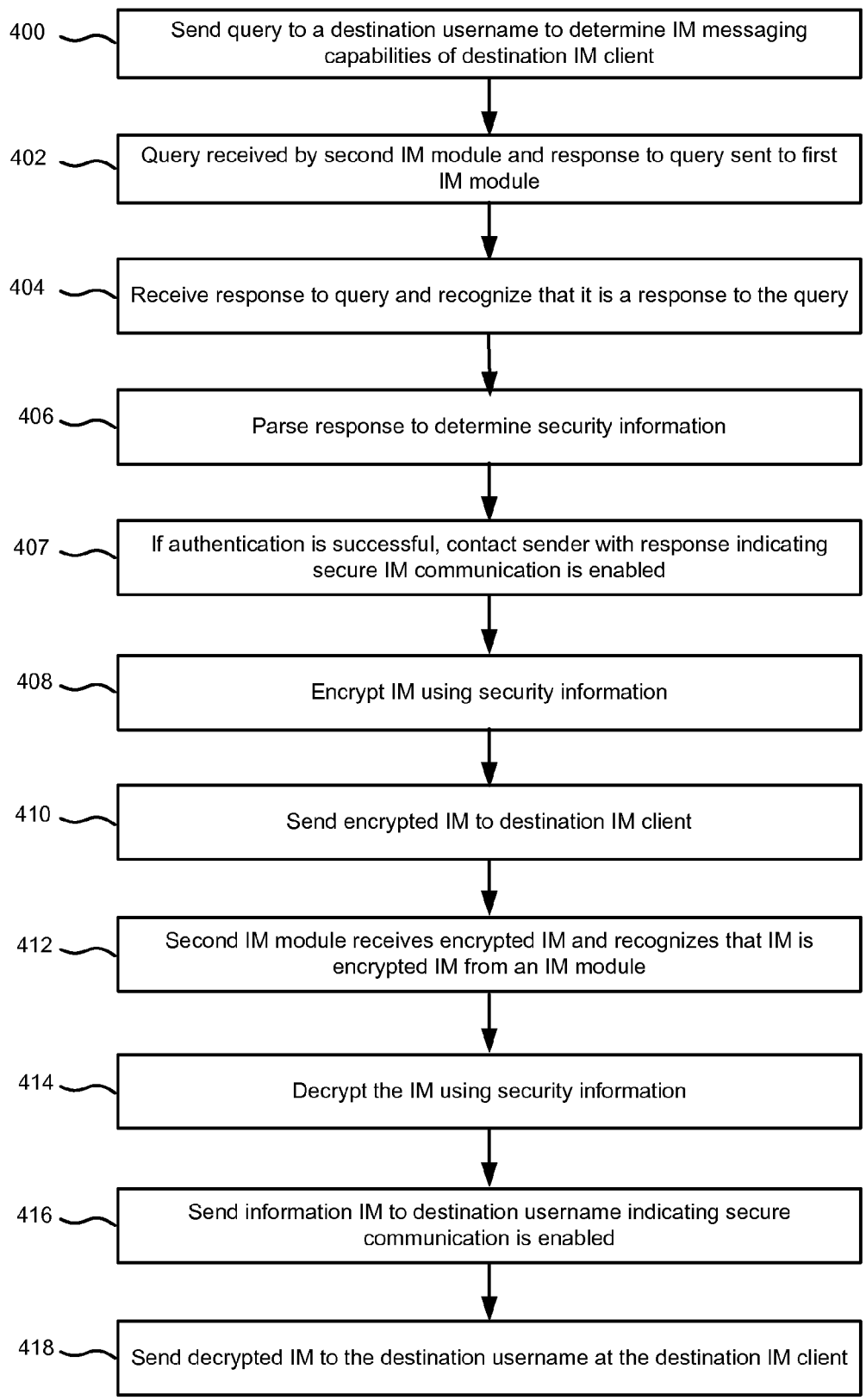
FIG. 4 depicts a simplified flow chart that describes the method of sending a secure communication between IM modules according to one embodiment under the present invention.

FIG. 4 depicts a simplified flow chart that describes the method of sending a secure communication between IM module 102-1 and IM module 102-2 according to one embodiment under the present invention.

In step 400, a query is sent to the destination username to determine the IM capabilities of the destination IM client 104-2. For example, an IM client 104-2 may be situated behind an IM module 102, in which case, secure communications may be sent, if enabled. Also, IM client 104-2 may not be situated behind an IM module 102, in which case, unencrypted IMs are sent.

In step 402, the query is received by IM module 102-2 and a response to the query is sent to IM module 102-1. IM module 102-2 receives the query that is sent to the username "Bob" because it is situated in front of the IM client 104-2 from which the username "Bob" has been logged in. In one embodiment, a "Get Info" query is sent to the username "Bob". The "Get Info" query may be any query that is interpreted by IM module 102 as a prompt to send some kind of information.

The response to the query, in one embodiment, may include security capabilities information that may be used to determine if a secure communication between IM module 102-1 and IM module 102-2 can be performed. For example, the body of the response to the "Get Info" query may communicate a company name for the recipient (e.g., "Company 2") and a security certificate, such as an X.509 certificate. Although an X.509 certificate is described, it will be understood that any security certificate may be used.

In step 404, a response to the query is received at IM module 102-1, which recognizes it as a response to the query. In one embodiment, the body of the response may be parsed and it may be recognized that the message is a response to the query that includes security capabilities information from IM module 102-2.

In step 406, the response is parsed to determine the security capabilities information. For example, the security capabilities information may indicate that the username "Bob" is logged into a PIM network 106 via an IM module 102-2. Additionally, it may be determined that a company name is "company 2" and that it is associated with a certificate that is also included.

In step 408, at least a portion of the IM is encrypted using the security capabilities information. For example, the text of the IM received in step 400 is encrypted using the security capabilities information. In one embodiment, the certificate determined in step 406 may be used to encrypt the IM. In an alternative embodiment, IM module 102-1 may retrieve or look up a certificate in a central certificate directory by the company name, determined using the security capabilities information. No matter which method is used, IM module 102-1 may verify the certificate and decide that it can trust it. In one embodiment, certificates are verified by checking to make sure that they are signed by a well-known and trusted Certificate Authority (CA), such as, but not limited to, Verisign.

In one embodiment, IM module 102-1 may generate a session key and encrypt the text of the IM received in step 400 with this key (e.g., symmetric encryption). The session key is then encrypted with a public key associated with IM module 102-2, and the encrypted text with the encrypted session key is signed with the public key associated with a CA of module 102-1 (e.g., situated at "Company 1") and placed into a digital envelope, such as an S/MIME envelope. This constitutes a payload component that may be inserted in the message body portion of an IM. Thus, a security capabilities information component that includes information that may be used by IM module 102-2 along with the encrypted payload may be inserted into the body of a public IM from "Alice" to "Bob" and forwarded through a PIM network 106 in step 410. Although the above encryption method is described, it will be recognized that other methods of encryption may be used.

In step 412, second IM module 102-2 receives the encrypted IM and recognizes that the IM is an encrypted IM from an IM module 102. In one embodiment, IM module 102-2 uses the attached security capabilities information component to determine that the IM includes encrypted information.

In step 414, the IM is decrypted using the security capabilities information. For example, IM module 102-2 parses the S/MIME-encoded message body. The session key is retrieved and decrypted using the private key of IM module 102-2. Then the message text is decrypted using the session key. The signature is verified using the public key of the CA of Company 2 (as was provided in the response IM in step 404).

In step 416, an informational IM is sent to the destination username, indicating that secure communications with the destination username have been enabled. For example, the informational message may state that IMs are encrypted using FaceTime's technology by a company, such as Company 1, and the username "Alice" that sent the IM is indeed associated with Company 1.

In step 418, the decrypted IM is sent to the destination username at the destination IM client 104-2. The S/MIME-encoded body is replaced with the original plain text that was sent in the original IM.

All subsequent messages exchanged as part of this IM conversation between "Alice" and "Bob" are transmitted between IM module 102-1 and IM module 102-2 as encrypted versions inside the message body portions of the IMs. The same session key may be used for the duration of the entire conversation.

Figure 5:
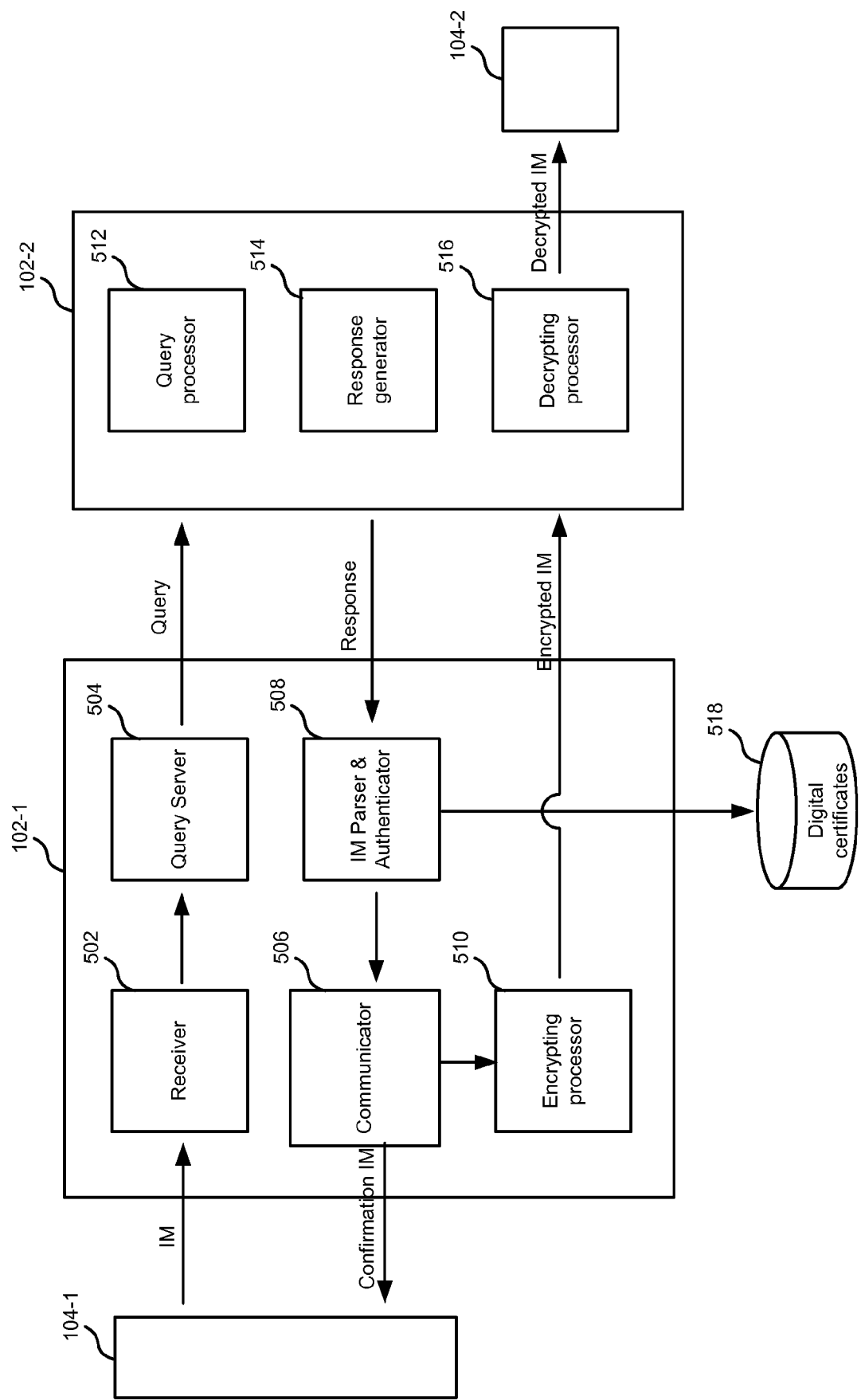
FIG. 5 depicts modules that may be used in embodiments of the present invention.

FIG. 5 depicts modules that may be used in embodiments of the present invention. As shown, IM module 102-1 communicates with IM module 102-2. An IM is sent from IM client 104-1 to a username associated with IM client 104-2. The IM is received at IM module 102-1 at a receiver 502. Receiver 502 may store the IM while a query is sent to IM module 102-2 to determine the IM messaging and security capabilities for an IM client 104 associated with the username.

Query sender 504 generates the query to send to the username, and the query is received at a query processor 512 at IM module 102-2. A response generator 514 sends a response with security capabilities information to the username that originally sent the IM. IM module 102-1 receives the response at IM parser and authenticator 508. IM parser and authenticator 508 parse the response and determine security capabilities information. The security capabilities information may be used to determine if IM module 102-2 is capable of receiving secure communications from IM module 102-1. Additionally, IM parser and authenticator 508 may authenticate the security capabilities information found in the response. For example, IM parser and authenticator 508 may either authenticate a digital certificate associated with the response or may look up a digital certificate in a database 518.

A communicator 506, if the response is authenticated, may send a confirmation IM to IM client 104-1 indicating that secure communications with the destination username is established.

An encrypting processor 510 then encrypts the IM. In one embodiment, the text of the original IM is encrypted and placed into the payload (message body) along with other security capabilities information. The encrypted IM is then sent in an IM through a public IM network 106 to the destination username.

The encrypted IM is received at a decrypting processor 516 of IM module 102-2. Decrypting processor 516 decrypts the IM and sends it to the username at IM client 104-2.

Accordingly, using IM modules, secure IM communications may be enabled. Instead of encrypting and decrypting IM messages at IM clients, an IM module is configured to encrypt messages and send the encrypted messages to another IM client behind another IM module. The IM module then intercepts, decrypts, and forwards the message to the IM client.

Because an IM module is situated such that IM clients communicate through the IM module, an effective method of sending encrypted IMs is provided at the IM module. Thus, IMs do not need to be encrypted at the IM clients. Additionally, the encrypted IMs are sent to a username associated with an IM client and are received at a second IM module. A second IM module is configured to decrypt the IM and send the decrypted IM to the username at the IM client. Thus, the destination IM client does not need to be configured to decrypt any encrypted emails. Accordingly, secure IM communications are enabled using IM modules.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for enabling secure instant message (IM) communication, the method comprising:

receiving, at a first computer system configured to proxy IM communications within a first communications network between IM clients of the same IM network unmodified in each of a plurality of IM network protocols, a plurality of policies for each IM network in a plurality of IM networks that are applicable to characteristics of IMs associated with a corresponding IM network protocol in the plurality of IM network protocols, each policy received at the computer system defining:

a set of characteristics pertaining to at least one IM network protocol in the plurality of IM network protocols or content of one or more IMs in the at least one IM network protocol in the plurality of IM network protocols, and an action to be performed using the computer system when one or more characteristics of at least one of the IMs handled by the computer system satisfy the set of characteristics defined in the policy;

receiving, at the first computer system, an IM in a first IM network protocol in the plurality of IM network protocols from a first IM client associated with the first communications network, the IM being addressed to an instant messaging username;

sending a query in at least one of the plurality of IM network protocols from the first computer system to the instant messaging username in response to performance of an action defined in at least one policy determined from the plurality of policies that are applicable to characteristics of IMs in the first IM network protocol based on one or more characteristics pertaining to the first IM network protocol of the IM or to content of the IM, the query requesting security capabilities of a second IM client associated with the instant messaging username;

receiving, at the first computer system, a response in at least one of the plurality of IM network protocols to the query requesting security capabilities of the second IM client from a second computer system, the second computer system configured to proxy IM communications within a second communications network between IM clients of the same IM network unmodified in each of a plurality of IM network protocols, wherein the response to the query requesting security capabilities of the second IM client comprises security capabilities information of the second computer system configured to proxy IM communications within a second communications network between IM clients of the same IM network unmodified in each of a plurality of IM network protocols;

determining, at the first computer system, whether the second IM client associated with the instant messaging username receives IMs through the second computer system via a public IM network using one of the plurality of IM network protocols based on the response;

determining, at the first computer system, whether the second computer system is capable of receiving secure IM communications from the first computer system for the second IM client based on the response;

based on positive determinations that the second IM client associated with the instant messaging username receives IMs through the second computer system and the second computer system is capable of receiving secure IM communications for the second IM client from the first computer system, encrypting at least a portion of the IM at the first computer system; and sending the encrypted at least a portion of the IM to the instant messaging username using the first computer system, wherein the second computer system receives the encrypted at least a portion of the IM, decrypts at least a portion of the IM, and sends the decrypted at least a portion of the IM to the instant messaging username.

2. The method of claim 1, wherein receiving, at the first computer system, the response in the at least one of the plurality of IM network protocols to the query requesting security capabilities of the second IM client from the second computer system comprises receiving, at the first computer system, a security certificate of the second computer system.

3. The method of claim 1, further comprising:
determining, with the first computer system, a type of secure IM that can be sent to the instant message username associated with the second IM client based on the security capabilities information of the second computer system.

4. The method of claim 1, wherein encrypting the at least a portion of the IM at the first computer system comprises using the security capabilities information to encrypt the at least a portion of the IM at the first computer system.

5. The method of claim 1, further comprising
sending another IM from the first computer system in one of the plurality of IM network protocols to the first IM client indicating that a secure IM can be sent to the second IM client based on a positive determination that the second computer system can receive secure IM communications.

6. The method of claim 2, wherein receiving, at the first computer system, the security certificate of the second computer system comprises receiving, at the first computer system, a security key for the second computer system.

7. The method of claim 6, further comprising:
authenticating, at the first computer system, the second computer system using the security key, thereby determining at the first computer system that the second computer system is capable of receiving secure IM communications.

8. The method of claim 1, wherein receiving, at the first computer system, the security capabilities information of the second computer system comprises receiving, at the first computer system, a company name associated with the second computer system.

9. The method of claim 8, wherein determining at the first computer system whether the second computer system is capable of receiving secure IM communications from the first computer system for the second IM client comprises performing a look up for the company name in a registry to determine if the second computer system is capable of receiving secure IM communications.

10. The method of claim 1, further comprising:
sending another IM from the first computer system in one of the plurality of IM network protocols to the second IM client indicating that a secure IM cannot be sent to the second IM client if it is determined that the second computer system cannot receive secure IM communications.

11. The method of claim 1, wherein sending the encrypted at least a portion of the IM to the instant message username using the first computer system comprises sending the encrypted at least a portion of the IM to the instant message username over the public IM network using the one of the plurality of IM network protocols.

12. The method of claim 1, wherein sending the encrypted at least a portion of the IM using the first computer system comprises sending the encrypted at least a portion of the IM using the first computer system in a new IM different from the IM received.

13. The method of claim 1, wherein at least one of the first IM client and second IM client comprises a public IM client.

14. A system for enabling secure instant message (IM) communications, the system comprising:
a database configured to store a plurality of policies for each IM network in a plurality of IM networks that are applicable to characteristics of IMs associated with a corresponding IM network protocol in a plurality of IM network protocols each policy defining:
a set of characteristics pertaining to at least one IM network protocol in the plurality of IM network protocols or content of one or more IMs in the at least one IM network protocol in the plurality of IM network protocols, and
an action to be performed when one or more characteristics of at least one of the IMs satisfy the set of characteristics defined in the policy;
a first computer system having a communications interface communicatively coupled to a first set of IM clients associated with a first communications network in a plurality of IM clients, wherein the first computer system is configured to proxy within the first communications network IMs sent from and destined for a first IM client in the first set of IM clients; and a second computer system having a communications interface communicatively coupled to a second set of IM clients associated with a second communications network in the plurality of IM clients, wherein the second computer system is configured to proxy within the second communications network IMs sent from and destined for a second IM client in the second set of IM clients;

wherein the first computer system is further configured to:
receive an IM in a first IM network protocol in the plurality of IM network protocols from the first IM client that is address to an instant messaging username,
send a query to the instant messaging username in response to performance of an action defined in at least one policy determined from the plurality of policies that are applicable to characteristics of IMs in the first IM network protocol based on one or more characteristics pertaining to the first IM network protocol of the IM or to content of the IM, the query requesting security capabilities of the second IM client,
receive a response to the query requesting security capabilities of the second IM client from the second computer system, response specifying security capabilities information of the second computer system,
determine that the second IM client receives IMs through the second computer system via a public IM network using one of the plurality of IM network protocols based on the response,
determine that the second computer system is capable of receiving secure IM communications from the first computer system based on the response,
encrypt at least a portion of the IM, and
send the encrypted at least a portion of the IM to the instant messaging username;
wherein the second computer system is further configured to:
receive the encrypted at least a portion of the IM,
decrypt at least a portion of the encrypted IM, and
send the decrypted at least a portion of the encrypted IM to the instant message username.

15. The system of claim 14, wherein the second computer system is further configured to send a response to one or more queries from the first computer system requesting security capabilities of the second IM client, the response comprising a security certificate of the second computer system.

16. The system of claim 15, wherein the first computer system is configured to authenticate the security certificate of the second computer system to determine if the second computer system can receive secure IM communications from the first computer system.

17. The system of claim 14, wherein the security capabilities information comprises a security key configured to authenticate the second computer system.

18. The system of claim 14, wherein the security capabilities information comprises a company name associated with the second computer system.

19. The system of claim 18, wherein the first computer system is further configured to look up the company name associated with the second computer system in a registry to determine if the second computer system can receive secure IM communications from the first computer system.

20. The system of claim 14, wherein at least one of the first and second IM clients comprise a public IM client.

21. The system of claim 14, wherein the first computer system is further configured to send the encrypted at least a portion of the IM over the public IM network using the one of the plurality of IM network protocols.

22. The system of claim 14, wherein the first computer system is further configured to send the encrypted at least a portion of the IM in a new IM different from the IM received.

23. A first instant message (IM) system configured to send and receive secure IM communications, the first IM system comprising:
a database configured to store a plurality of policies for each IM network in a plurality of IM networks that are applicable to characteristics of IMs associated with a corresponding IM network protocol in a plurality of IM network protocols each policy defining:
a set of characteristics pertaining to at least one IM network protocol in the plurality of IM network protocols or content of one or more IMs in the at least one IM network protocol in the plurality of IM network protocols, and
an action to be performed when one or more characteristics of at least one of the IMs satisfy the set of characteristics defined in the policy;
a processor; and
a memory coupled to the processor and configured to store a set of program modules executable by the processor, the set of program modules including:
a receiver module configured to receive an IM in a first IM network protocol in the plurality of IM network protocols from a first IM client, the IM being addressed to an instant message username;
a secure communication analyzer module configured to:
determine whether a second IM client associated with the instant message username receives IMs through a second IM system via a public IM network using one of the plurality of IM network protocols based on information received from the second IM system in response to one or more queries sent to the instant messaging username requesting security capabilities of the second IM client, and
determine whether the second IM system is capable of receiving secure IM communications from the first IM system based on the information received from the second IM system;
an encrypting processor module configured to encrypt at least a portion of the based on a determination that the second IM client associated with the instant message username receives IMs through the second IM system and the second IM system is capable of receiving secure IM communications from the first IM system; and
a communicator module configured to:
send a query to the instant messaging username in response to performance of an action defined in at least one policy determined from the plurality of policies that are applicable to characteristics of IMs in the first IM network protocol based on one or more characteristics pertaining to the first IM network protocol of the IM or to content of the IM, the query requesting the security capabilities of the any IM clients associated with the instant messaging username, and
send the encrypted at least a portion of the IM to the instant message username;

wherein the second IM system receives the encrypted at least a portion of the IM, decrypts at least a portion of the encrypted IM, and sends the decrypted at least a portion of the encrypted IM to the instant messaging username.

24. The first IM system of claim 23, further comprising a query server module configured to generate the one or more queries sent to the instant message username requesting the security capabilities of the second IM client.

25. The first IM system of claim 24, further comprising a response receiver module configured to receive a response to the one or more queries sent to the instant messaging username requesting security capabilities of the second IM client, the response comprising security capabilities information of the second IM system.

26. The first IM system of claim 25, further comprising an authenticator module configured to authenticate the security capabilities information to determine if the second IM system can receive secure IM communications from the first IM system.

27. The first IM system of claim 26, wherein the security capabilities information comprises a security key used to authenticate the second IM system.

28. The first IM system of claim 26, wherein the security capabilities information comprises a company name used to identify the second IM system.

29. The first IM system of claim 28, further comprising a registry query processor module configured to look up the company name in a registry to determine whether or not the second IM system can receive secure IM communications.

30. The first IM system of claim 23, wherein the communicator module is configured to send an IM to the second IM client indicating that a secure IM cannot be sent to the second IM client if it is determined that the second IM system cannot receive secure IM communications.

31. The first IM system of claim 23, wherein the encrypted at least a portion of the IM is sent over the public IM network.

32. The first IM system of claim 23, wherein the at least a portion of the IM is encrypted and sent in a new IM different from the IM received.

33. The first IM system of claim 23, wherein at least one of the first IM client and second IM client comprises a public IM client.

* * * * *